(12) United States Patent
Kursun

(10) Patent No.: US 11,586,681 B2
(45) Date of Patent: Feb. 21, 2023

(54) SYSTEM AND METHODS TO MITIGATE ADVERSARIAL TARGETING USING MACHINE LEARNING

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 911 days.

(21) Appl. No.: 16/431,088

(22) Filed: Jun. 4, 2019

(65) Prior Publication Data

US 2020/0387752 A1    Dec. 10, 2020

(51) Int. Cl.
| | |
|---|---|
| *G06K 9/62* | (2022.01) |
| *G06N 20/20* | (2019.01) |
| *G06F 16/9035* | (2019.01) |
| *G06N 3/04* | (2006.01) |
| *G06N 3/08* | (2006.01) |
| *G06F 18/214* | (2023.01) |
| *G06F 18/2115* | (2023.01) |
| *G06F 18/21* | (2023.01) |
| *G06N 3/045* | (2023.01) |

(52) U.S. Cl.
CPC ...... *G06F 16/9035* (2019.01); *G06F 18/2115* (2023.01); *G06F 18/2148* (2023.01); *G06F 18/2185* (2023.01); *G06N 3/045* (2023.01); *G06N 3/08* (2013.01); *G06N 20/20* (2019.01)

(58) Field of Classification Search
CPC ............... G06K 9/6257; G06K 9/6231; G06K 9/6264; G06K 9/627; G06F 16/9035; G06N 20/20; G06N 3/0454; G06N 3/08; G06V 10/82
See application file for complete search history.

(56) References Cited

U.S. PATENT DOCUMENTS

| | | |
|---|---|---|
| 6,925,441 B1 | 8/2005 | Jones, III et al. |
| 8,219,438 B1 | 7/2012 | Moon et al. |
| 8,285,581 B2 | 10/2012 | Abe et al. |
| 8,452,653 B1 | 5/2013 | Gottfurcht et al. |

(Continued)

OTHER PUBLICATIONS

Biggio, B. and Roli, F., 2018. Wild patterns: Ten years after the rise of adversarial machine learning. Pattern Recognition, 84, pp. 317-331.*

(Continued)

*Primary Examiner* — Zhitong Chen
(74) *Attorney, Agent, or Firm* — Moore & Van Allen PLLC; Nicholas C. Russell

(57) ABSTRACT

A system for adversarial targeting mitigation is provided, the system generally comprising identifying, using an artificial intelligence and machine learning model engine, a user targeting pattern employed by an entity based on interaction data between the entity and one or more users, based on the identified pattern of targeting, training the machine learning model to identify specific user profile data correlated with specific responses from the entity, identifying, using the machine learning model, a subset of one or more favorable responses from the specific responses, and triggering the one or more favorable responses by altering the user profile data for the one or more users prior to interaction with the specific entity.

20 Claims, 9 Drawing Sheets

(56) References Cited

U.S. PATENT DOCUMENTS

| | | |
|---|---|---|
| 8,571,919 B2 | 10/2013 | Rane et al. |
| 8,650,075 B2 | 2/2014 | Fano et al. |
| 10,185,917 B2 | 1/2019 | Greystoke et al. |
| 2004/0024769 A1 | 2/2004 | Forman et al. |
| 2005/0071223 A1 | 3/2005 | Jain et al. |
| 2007/0179846 A1 | 8/2007 | Jain et al. |
| 2014/0195396 A1 | 7/2014 | Bhakta et al. |
| 2015/0170175 A1 | 6/2015 | Zhang et al. |
| 2015/0199754 A1 | 7/2015 | Greystoke et al. |
| 2015/0220999 A1 | 8/2015 | Thornton et al. |
| 2015/0310131 A1 | 10/2015 | Greystoke et al. |
| 2016/0055537 A1 | 2/2016 | Tiger et al. |
| 2016/0203497 A1* | 7/2016 | Tietzen .............. G06Q 30/0201 705/14.27 |
| 2017/0169455 A1 | 6/2017 | Dhawan et al. |
| 2017/0243238 A1 | 8/2017 | Kosai et al. |
| 2017/0330058 A1* | 11/2017 | Silberman .............. G06N 20/00 |
| 2017/0364823 A1 | 12/2017 | Ilic et al. |
| 2018/0053114 A1* | 2/2018 | Adjaoute ........... G06Q 20/4016 |
| 2019/0065970 A1 | 2/2019 | Bonutti et al. |
| 2019/0073335 A1 | 3/2019 | Foley et al. |
| 2019/0108458 A1 | 4/2019 | Yu et al. |
| 2019/0139086 A1* | 5/2019 | Kiladis .................... G06N 3/08 |
| 2019/0149623 A1 | 5/2019 | McPhee et al. |
| 2019/0164202 A1 | 5/2019 | Ukhalkar et al. |
| 2019/0259069 A1* | 8/2019 | Kosai ................. G06Q 30/0269 |
| 2020/0134493 A1 | 4/2020 | Bhide et al. |

OTHER PUBLICATIONS

Detecting racial bias in algorithms and machine learning. Nicole Turner Lee. Journal of Information, Communication & Ethics in Society. 16.3: 252-260. Emerald Group Publishing Limited. (2018).

* cited by examiner

SYSTEM AND METHODS TO MITIGATE ADVERSARIAL TARGETING USING MACHINE LEARNING

BACKGROUND

With an increase in unique user data stored for individuals by online providers, personalized, dynamic interactions based on user data have become increasingly prominent in order to provide uniquely tailored experiences. However, individualized experiences with online providers do not typically provide insight as to the metrics used by the online providers to tailor individual experiences, and may lead to undetected and unfair outcomes for certain groups of users.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for protection against adversarial targeting schemes. A collaborative artificial intelligence system for improving machine learning model adaptability is provided and supports a system for targeting determination and intelligent response. The adversarial targeting mitigation system and methods generally comprise: a module containing a memory storage device, a communication device, and a processor, with computer-readable program code stored thereon, wherein executing the computer-readable code is configured to cause the processor to: identify, using a machine learning model, a user targeting pattern employed by an entity based on interaction data between the entity and one or more users; based on the identified pattern of targeting, train the machine learning model to identify specific user profile data correlated with specific responses from the entity; identify, using the machine learning model, a subset of one or more favorable responses from the specific responses; and trigger the one or more favorable responses by altering the user profile data for the one or more users prior to interaction with the specific entity.

In some embodiments, the system is further configured to generate synthetic profile data; transmit the synthetic profile data to the entity; analyze, using the machine learning model, entity responses to the synthetic profile data from the entity; and update the identified targeting pattern using the analyzed entity responses to the synthetic profile data.

In some embodiments, the system is further configured to identify, via the machine learning model, a subset of one or more desired responses associated with the synthetic profile data; and trigger the one or more desired responses by replacing a subset of the profile data with the synthetic profile data.

In some embodiments, the system is further configured to receive profile data for the one or more users and store the profile data for the one or more users as mixed population data in a historical database; monitor data transmitted between the one or more users and the entity and store the data transmitted as interaction data in the historical database; identify variances in the interaction data and variances in the mixed population data between the one or more users; and analyze, using a machine learning model, the variances in the interaction data and the variances the mixed population data and train the machine learning model to identify the targeting pattern employed by the entity.

In some embodiments, the system further comprises: analyzing the interaction data to compare treatment of the one or more users by the identified targeting pattern; identifying a specific user that receives favorable treatment by the adversarial targeting scheme relative to other users; and incorporating profile data from the specific user that receives favorable treatment into the profiles of one or more other users.

In some embodiments, altering the user profile data for the one or more users further comprises generating random user profiles containing a randomized set of user profile data.

In some embodiments, the randomized set of user profile characteristics contains synthetically generated user profile data and user profile data from a mixed population of user data.

In some embodiments, the user profile data is altered and in real-time in response to the interaction data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
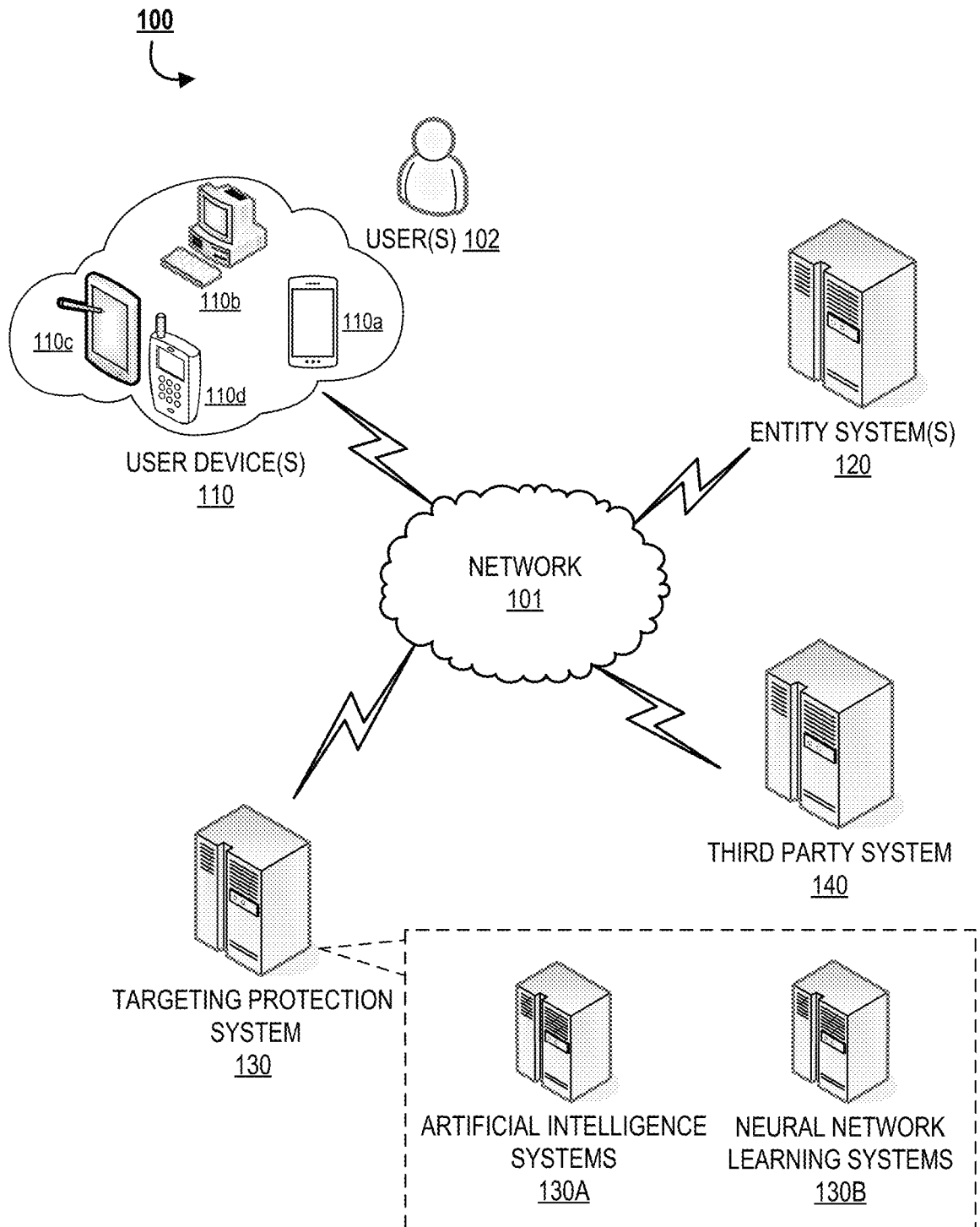
Figure 2:
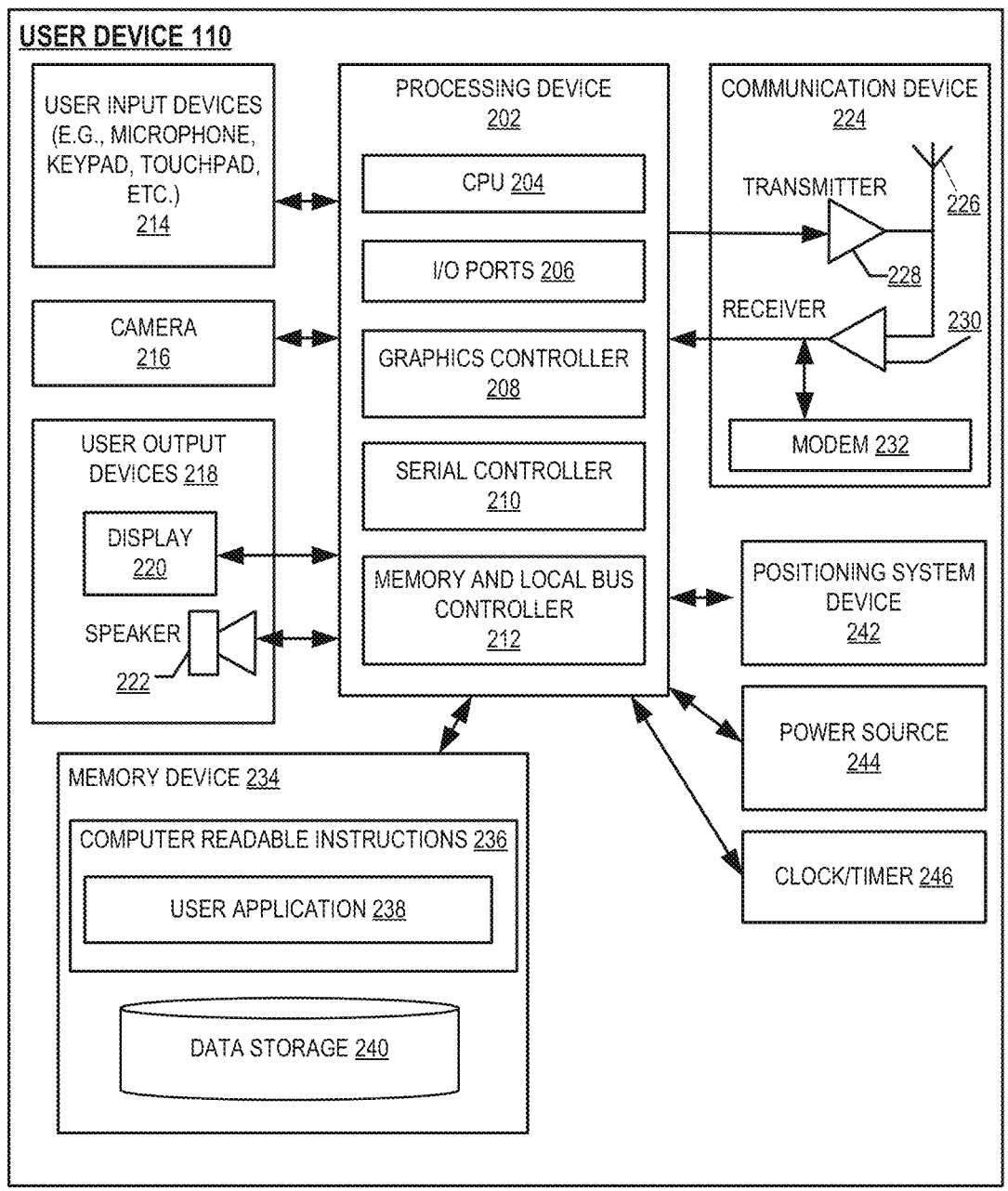
Figure 3:
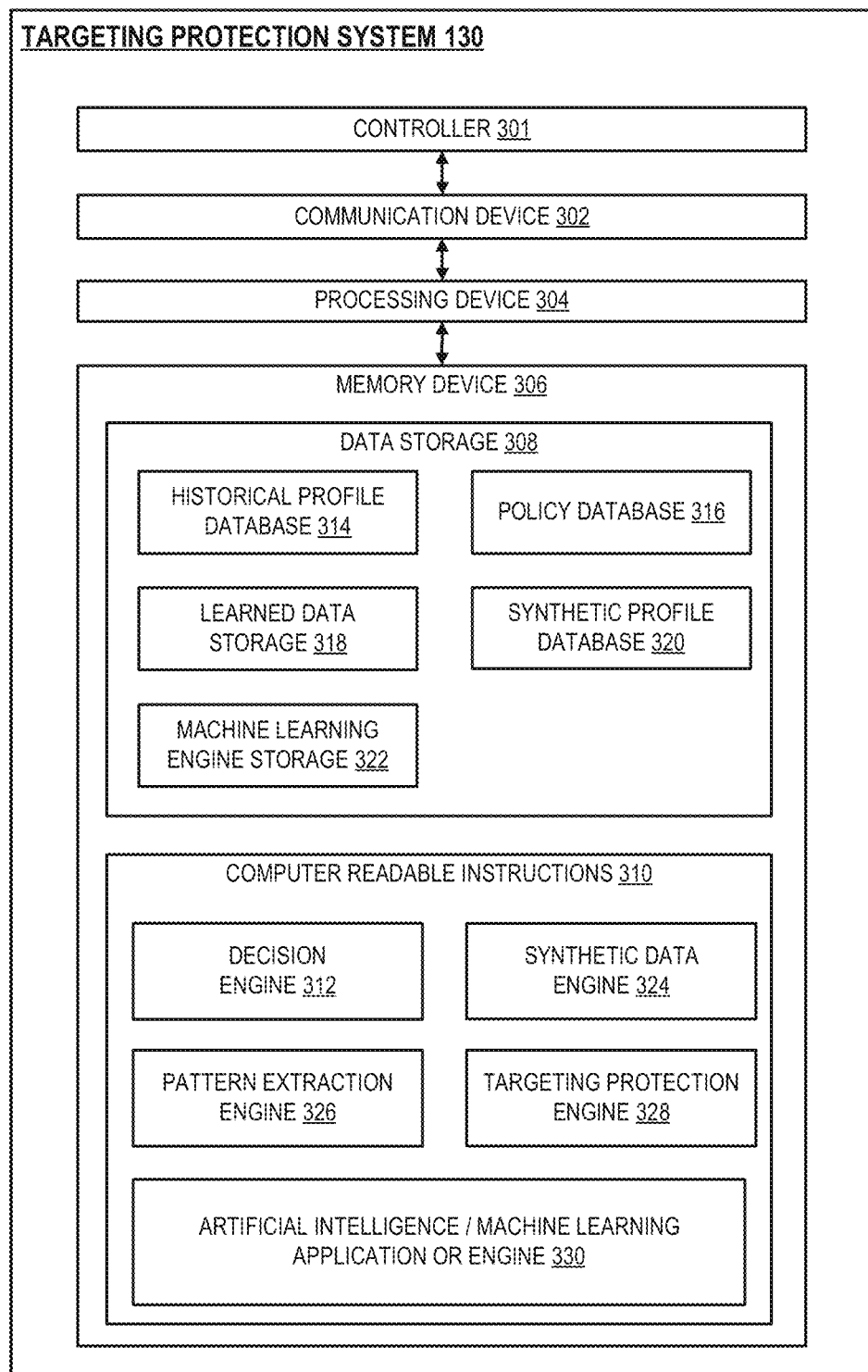
Figure 4A:
Figure 4A:
Figure 4B:
Figure 4B:
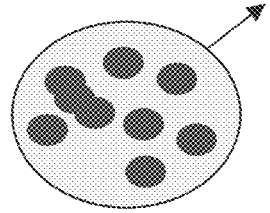
Figure 4B:
Figure 4C:
Figure 4C:
Figure 5:
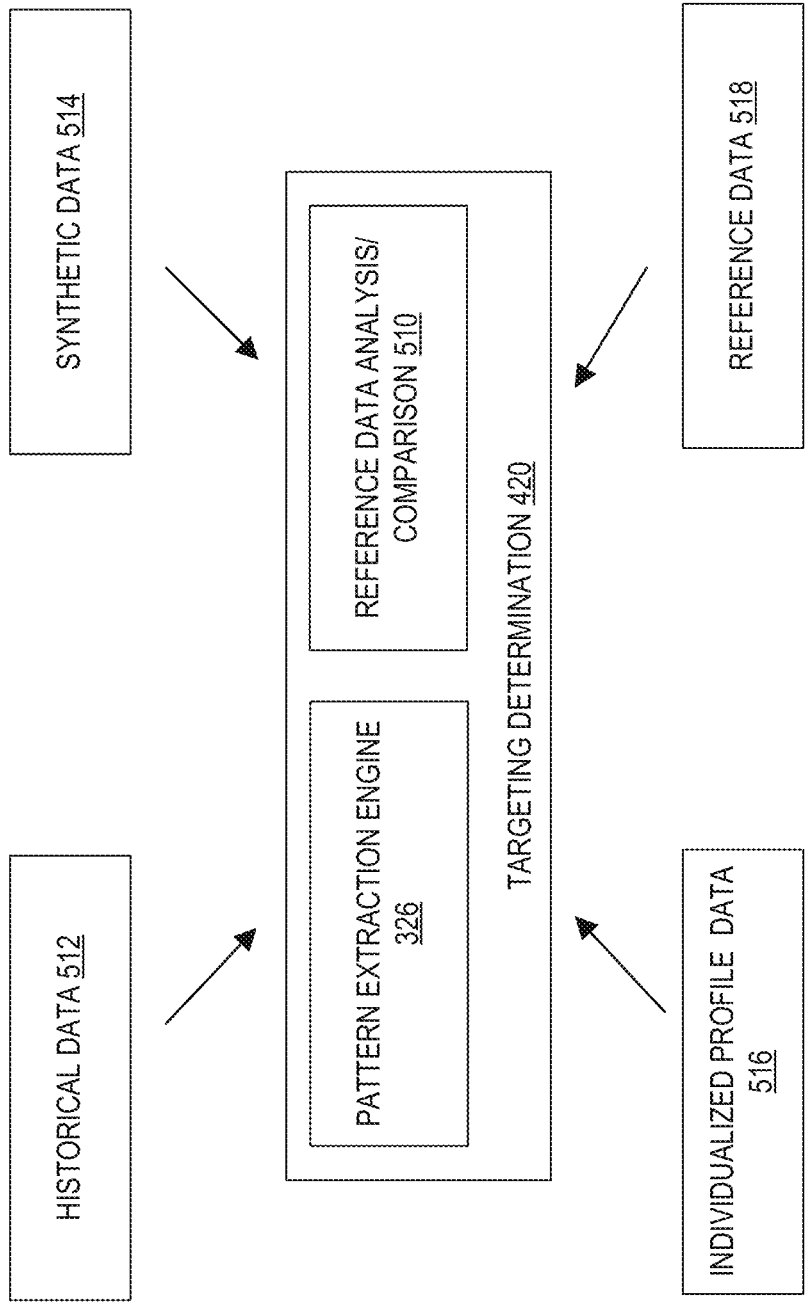
Figure 6:
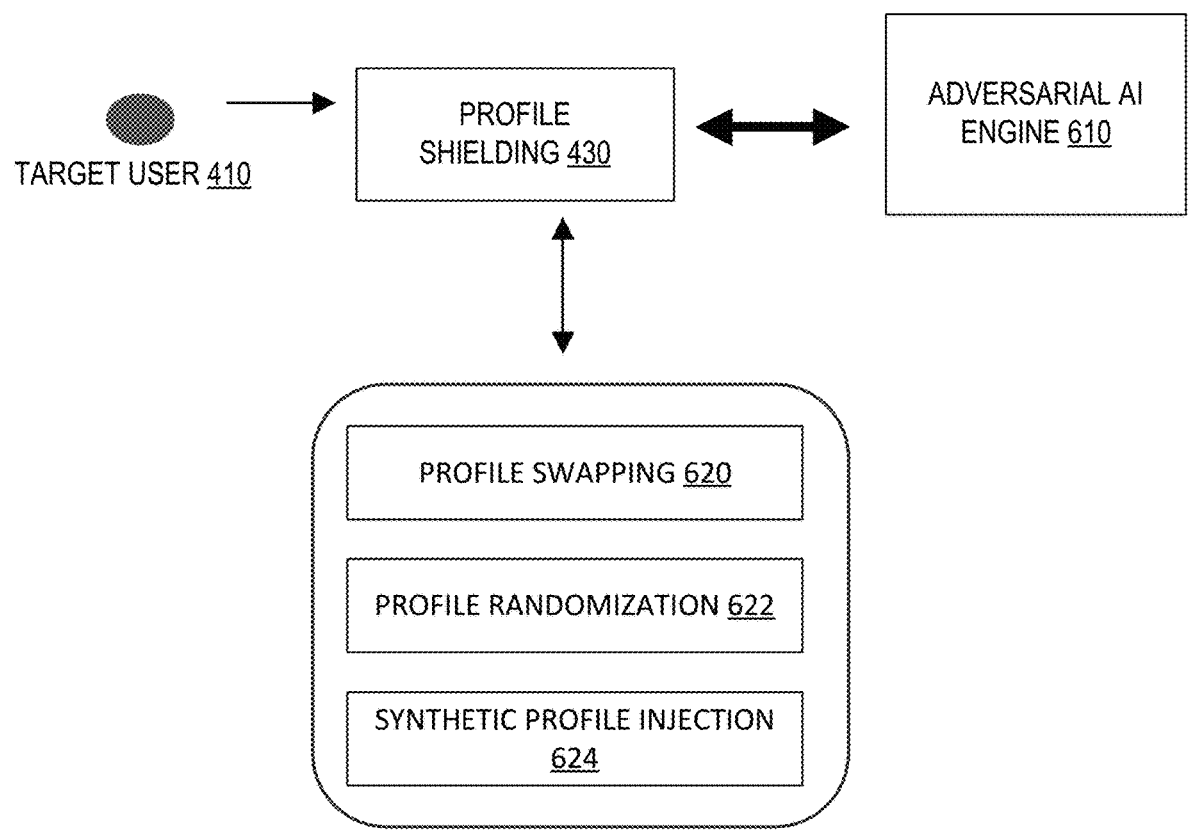
Figure 7:
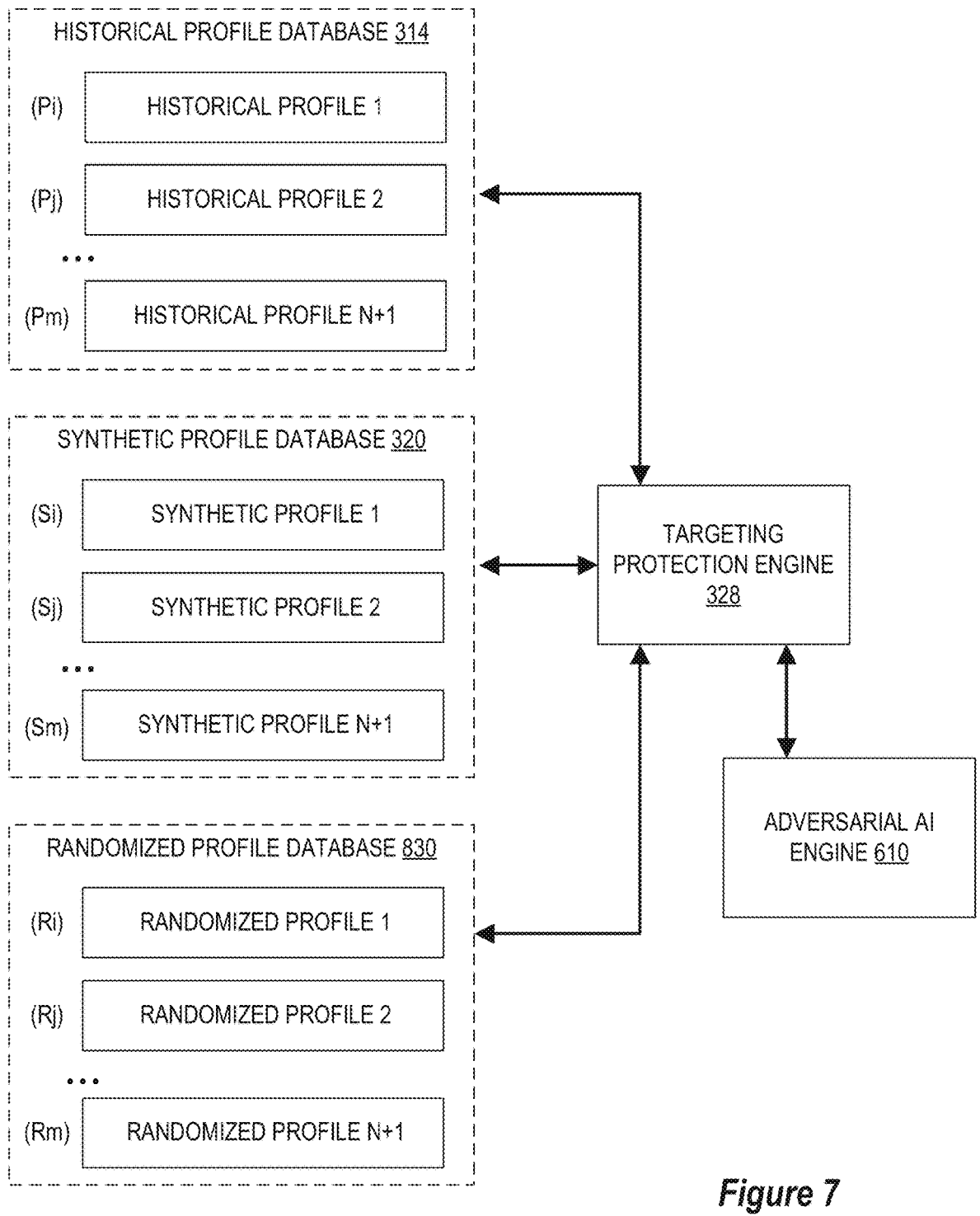
Figure 8:
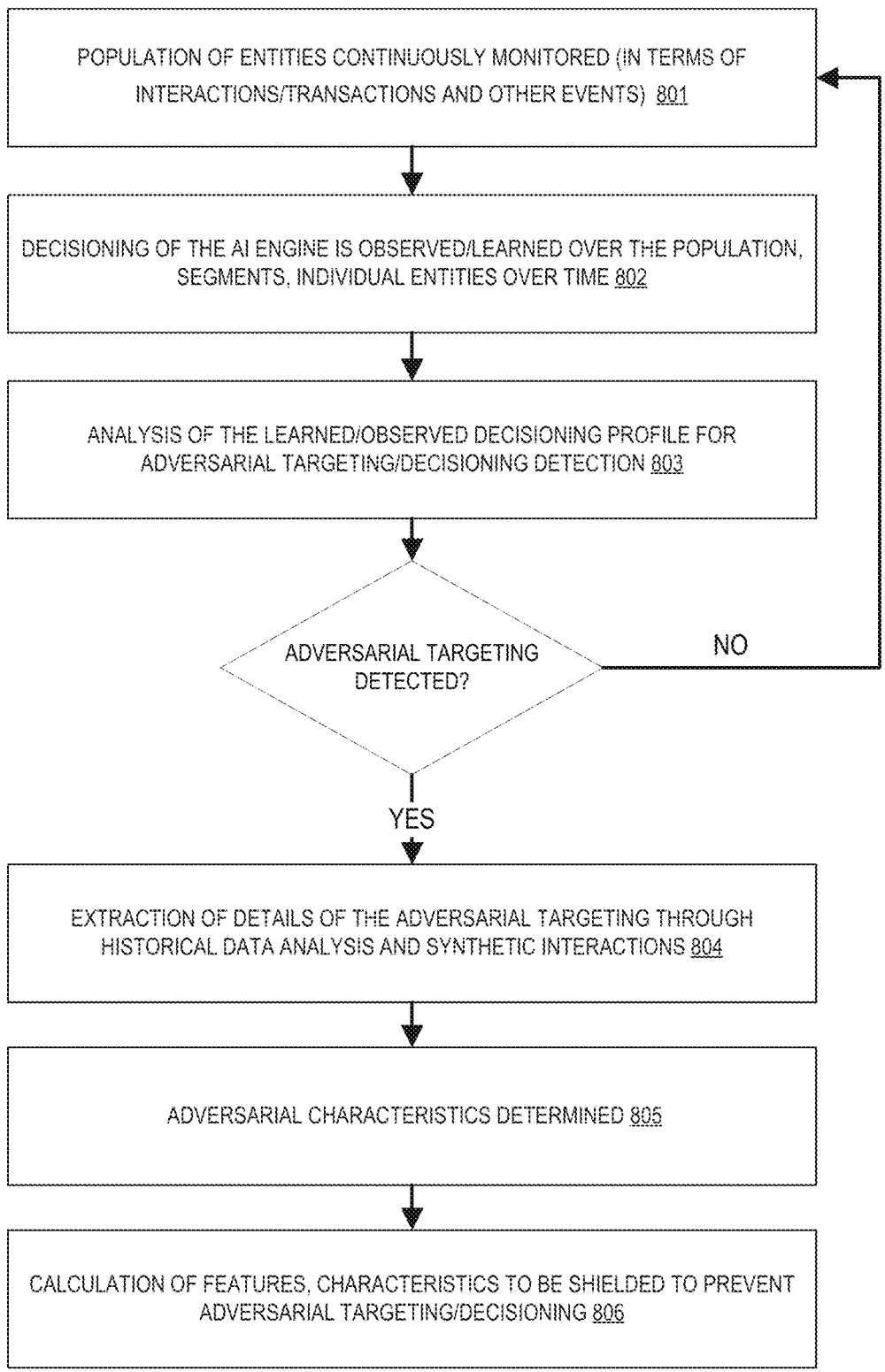
Figure 9:
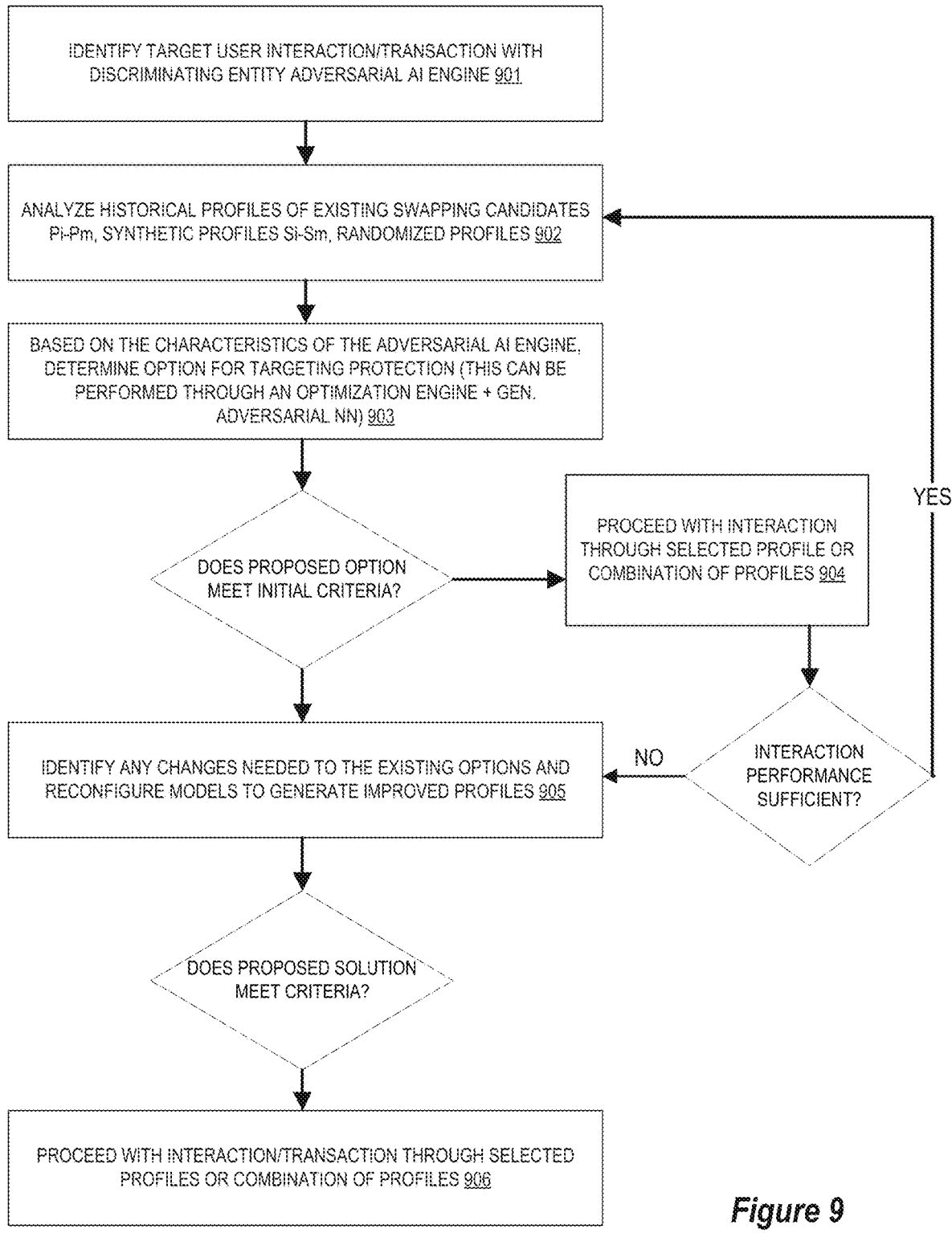

Having thus described embodiments of the invention in general terms, reference will now be made to the accompanying drawings, wherein:

FIG. 1 provides a system environment 100, in accordance with one embodiment of the invention;

FIG. 2 provides a block diagram of a user device 110, in accordance with one embodiment of the invention;

FIG. 3 provides a block diagram of a machine learning and artificial intelligence control system 130, in accordance with one embodiment of the invention;

FIG. 4a provides a high level process flow for interaction between a decision engine and a target user, in accordance with one embodiment of the invention;

FIG. 4b provides a high level process flow for targeting determination between a target user and mixed data population, in accordance with one embodiment of the invention;

FIG. 4c provides a high level process flow for interaction between a decision engine and a target user with included profile shielding, in accordance with one embodiment of the invention;

FIG. 5 provides a block diagram of data collection and utilization for targeting determination, in accordance with one embodiment of the invention;

FIG. 6 provides a high level process flow for implementation of profile shielding by a target user, in accordance with one embodiment of the invention;

FIG. 7 provides a block diagram of profile data sets utilized by a targeting protection engine, in accordance with one embodiment of the invention;

FIG. 8 provides a high level process flow for detection of adversarial targeting and extraction of targeting and decisioning details, in accordance with one embodiment of the invention; and FIG. 9 provides a high level process flow for analyzing and configuring profile shielding, in accordance with one embodiment of the invention.

DETAILED DESCRIPTION OF EMBODIMENTS OF THE INVENTION

Embodiments of the system, as described herein leverage artificial intelligence, machine-learning, and/or other complex, specific-use computer systems to provide a novel approach for identifying and analyzing targeting patterns. The system utilizes machine learning models to process targeting and decision data to determine if a targeting scheme is being implemented in a given scenario. The system may intelligently inject various historical data and synthetic data to further assess the patterns, metrics, and weighting structures associated with targeting schemes. The system then analyzes and evaluates the models based on performance metrics of the models which gauge the performance (i.e., accuracy, resource efficiency, reliability, stability), adaptability (i.e., robustness and diversity), and the like of the machine learning models. Based on identified targeting patterns, the system is also configured to generate optimal profile data and inject the profile data into the real-time data stream. In this way, the system may identify and counteract the effects of targeting schemes that may otherwise lead to a negative outcomes for certain users, and may be further adaptable to unforeseen or adversarial scenarios that may not have been incorporated in initial training of the models. As such, the present invention provides a technical solution to a technical problem of adversarial targeting by implementing artificial intelligence and machine learning technologies in real time in order to shield from and counteract against identified targeting scheme that may otherwise negatively impact a targeted user.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the collaborative machine learning system. In some embodiments, a user may be a computing device user, a phone user, a mobile device application user, a customer of an entity or business, a system operator, and/or employee of an entity (e.g., a financial institution). In a specific embodiment, a user may be a managing user of a machine learning model, wherein the system enables the user to reconfigure the model based on user-specified criteria and policies. In another specific embodiment, a user may be a customer accessing a user account via an associated user device, wherein data from an interaction between the user and an entity is analyzed or processed by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, or any combination of the aforementioned. The device may be used by the user to access the system directly or through an application, online portal, internet browser, virtual private network, or other connection channel.

As used herein, the term "entity" may be used to include any organization or collection of users that may interact with the collaborative machine learning system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, resource management firms, insurance companies and the like. In other embodiments, an entity may be a business, organization, a government organization or the like that is not a financial institution.

As used herein, "authentication information" may refer to any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing performance of one or more machine learning models or engines using performance metrics associated with one or more of the models.

As used herein, an "interaction" may refer to any action or communication between users, entities, or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface (e.g., clicking, swiping, text or data entry, and the like), authentication actions (e.g., signing-in, username and password entry, PIN entry, and the like), account actions (e.g., account access, fund transfers, and the like) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

FIG. 1 provides a system environment 100, in accordance with one embodiment of the invention. As illustrated in FIG. 1, targeting protection system 130 is operatively coupled, via a network 101, to the user device(s) 110 (e.g., a plurality of user devices 110a-110d), third party system 140, and entity system 120. While only one third party system 140 is depicted in the embodiment shown in FIG. 1, it is understood that the network 101 may interconnect targeting protection system 130, entity system 120, and user device 110 with multiple third party systems 140. In this way, the targeting protection system 130 can send information to and receive information from the user device 110, the third party system 140 and the entity system 120. In the illustrated embodiment, the plurality of user devices 110a-110d provide a plurality of communication channels through which the entity system 120, third party system 140, and/or the targeting protection system 130 may communicate with the user 102 over the network 101.

In the illustrated embodiment, the targeting protection system 130 further comprises an artificial intelligence (AI) system 130a and a machine learning system 130b which may be separate systems operating together with the targeting protection system 130 or integrated within the targeting protection system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein. Non-limiting examples of applications in which the system described herein may be incorporated include cybersecurity, marketing, misappropriation detection, medicine, autonomous device (e.g., self-driving cars), AI assistants, and the like. In some embodiments, interactions performed between the user device(s) 110 and the third party entity system 120 are intercepted and received by the targeting protection system 130, wherein interaction data may be extracted from an interaction over the network 101 by the targeting protection system 130 for decisioning. Data monitored and/or extracted by the system may include, in a non-limiting example, user identifying information, communication history, transaction history, and the like. Data, such as user interaction data, may be acquired from across communication channels of an entity such as phone lines, text messaging systems, email, applications (e.g., mobile applications), websites, automated teller machines (ATMs), card readers, call centers, electronic assistants, instant messaging systems, interactive voice response (IVR) systems, brick-and-mortar locations and the like.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while a data flow or data stream between the user device 110 and the entity system 120 is monitored by or received by the targeting protection system 130 over the network 101 to be processed or analyzed. In some embodiments a user 102 is a user requesting service from the entity (e.g., customer service) or interacting with an account maintained by the entity system 120. In an alternative embodiment, the user 102 is a user interacting with, maintaining, or employing a machine learning model, wherein the system enables the user to reconfigure the model based on user-specified criteria and policies.

FIG. 2 provides a block diagram of a user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In one embodiment, the user 102 is a maintaining entity of a targeting protection system 130, wherein the user application enables the user 102 to define policies and reconfigure a the machine learning model. In one embodiment, the user 102 is a customer of a financial entity and the user application 238 is an online banking application providing access to the entity system 120 wherein the user may interact with a user account via a user interface of the user application 238, wherein the user interactions may be provided in a data stream as an input to one or more machine learning models. In some embodiments, the user 102 may be the subject of targeting schemes or patterns which are detected by targeting protection system 130, later to referred to herein as a subset of user called a target user 410.

The processing device 202 may be configured to use the communication device 224 to communicate with one or more other devices on a network 101 such as, but not limited to the entity system 120 and the targeting protection system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the targeting protection system 130 and which may be associated with one or more entities, institutions or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the targeting protection system 130 to provide access to user accounts stored and maintained on the entity system 120. In some embodiments, the entity system 120 may communicate with the targeting protection system 130 during an interaction with a user 102 in real-time, wherein user interactions may be monitored and processed by the targeting protection system 130 in order to analyze interactions with the user 102 and reconfigure the machine learning model in response to changes in a received or monitored data stream. In one embodiment, the system is configured to receive data for decisioning, wherein the received data is processed and analyzed by the machine learning model to determine a conclusion.

FIG. 3 provides a block diagram of the targeting protection system 130, in accordance with one embodiment of the invention. The targeting protection system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the targeting protection system 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the targeting protection system 130 comprises computer-readable instructions 310 stored in the memory device 306, which in one embodiment includes the computer-readable instructions 310 of a decision engine 312, a synthetic data engine 324, a pattern extraction engine 326, a targeting protection engine 328, and an artificial intelligence (AI) and machine learning application or engine 330. In one embodiment, the AI and machine learning engine 330 may be utilized by the decision engine 312, synthetic data engine 324, pattern extraction engine 326, and/or targeting protection engine 320 to, respectively, analyze performance metrics of a machine learning model and generate synthetic data for injection into channels of communication between a target user and an entity which has been identified as utilizing adversarial targeting.

In some embodiments, the memory device 306 includes data storage 308 for storing data related to the system environment, but not limited to data created and/or used by the decision engine 312, synthetic data application 314, pattern extraction engine 326, targeting protection engine 328, and AI and machine learning engine 330. Storage of data related to the system entrainment may include various databases such as historical profile database 314, policy database 316, learned data storage 318, synthetic profile database 320, and the machine learning engine storage 322.

The historical profile database 314 is used to store information regarding past interactions (e.g., account actions, transactions, communications, inputs) and/or content of a past data stream. In some embodiments, the historical interaction database 314 may be configured to store data from an incoming data stream in real-time. In some embodiments, the policy database 316 is configured to store pre-determined policies, conditions, rules, thresholds, user profile data or the like for evaluating and managing the targeting protection system 130 (e.g., model configurations, user characteristics, and model adaptations). The policy database 316 my further be configured to store learned policies, conditions, rules, thresholds, or the like as determined in real-time by the machine learning models of the system described herein. In some embodiments, the policy database 316 is further configured to store probability metrics, system performance metrics, cost metrics, benefit metrics, cost-change metrics, adversarial scenarios or data, extrapolated scenarios or data, and the like associated with the targeting protection system 130. In some embodiments, the policy database 316 and/or the historical interaction database 314 include pre-existing training data for training a machine learning or artificial intelligence engine. In some embodiments, the policy database 316 is configured for storing settings associated with the system itself such as energy efficiency settings, computer resource use efficiency settings, response time settings, regulatory guidelines, and the like.

The synthetic profile database 320 is configured to store synthetically generated data generated by the system (i.e., via synthetic data engine 324). The synthetic data stored in the synthetic profile database 320 may be used for training a machine learning model or artificial intelligence engine, and may also be combined with historical data or user profile data in order to create synthetic profiles, as further discussed in FIG. 8. The synthetic profile database 320 may include adversarial or extrapolated scenarios or data generated by the systems described herein which may be fed back into machine learning models to train the system. In some embodiments, the system 130 may include an adversarial function configured for providing adversarial learning and modeling to the system by introducing unreliable or erroneous data to the system; a learning or adaptation function for defining system response to data changes or an adaptation rate for implementing changes (i.e., model reconfiguration) within an architecture of the systems described herein; and an alertness function and robustness function for defining an appropriate system reaction, response, or extent of system reaction based on one or more environmental conditions or previous interactions. In some embodiments, various synthetic data may be injected in an outgoing data stream in real-time and over multiple iterations in order to further aid in identifying targeting patterns by analyzing the various responses received in correspondence to the synthetic data.

The machine learning engine storage 322 is configured for storing one or more artificial intelligence engines, machine learning models, or the like. The AI engines and machine learning models described herein may include engines and/or models directed to, for example, cybersecurity, marketing, misappropriation detection, medicine, autonomous deices (e.g., self-driving cars), AI assistants, or the like. In one embodiment, the machine learning engine storage 322 is configured to store a collection of diverse machine learning engines/models to provide the system with a high level of adaptability to constantly changing environments (i.e., changes in a received data stream).

In one embodiment of the invention, the targeting protection system 130 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the targeting protection system 130 further comprises a dynamic optimization algorithm to be executed by the processing device 304 or a controller 301 for reconfiguring a machine learning model based on, for example, analyzed performance metrics. That said, the algorithm may further include a data pattern of a streamed data source a data output from one or more models, or the like during an assessment of a new model reconfiguration. The dynamic optimization algorithm may further receive the data stream and identified changes to the data stream in real-time for determining reconfigurations.

In non-limiting embodiments, the data stream includes such as system hardware information (e.g., hardware energy usage) or other non-financial authentication information data (e.g., cybersecurity). In still other embodiments, the data stream may contain data collected by a security system for detecting intrusion (e.g., video monitoring, motion detecting, or the like). In other non-limiting examples of data monitored within the data stream include information regarding past, current, or scheduled transactions or other financial data associated with the user. Transaction information may include transaction amounts, payor and/or payee information, transaction dates and times, transaction locations, transaction frequencies, and the like. In some embodiments, data may include information regarding account usage. For example, the data stream may include information regarding usage of a credit or debit card account such as locations or time periods where the card was used. In another example, the data may further include merchants with whom the user frequently interacts.

In some embodiments, the data stream may contain information regarding characteristics of the data itself which may be monitored by the system. For example, the data stream may contain information regarding the quality of the data (e.g., file size, bit rate of stream), the fidelity of the data (i.e., data accuracy), mutability of the data stream (i.e., how quickly a data pattern in the data stream changes).

The system receives the streaming data where the data is then analyzed and processed by one or more machine learning models for decisioning purposes. Machine learning models, individually and/or structured as clusters, may be trained based on predetermined training data and/or new data acquired in real-time (i.e., from the data stream), wherein the system learns from the data by dynamically identifying patterns as the information is received and processed. In some embodiments of the present invention, machine learning models may be adaptive, wherein the models may be reconfigured based on different environmental conditions and/or an analysis and evaluation of the individual model performance. The model may be modified by the system by having one or more individual models and/or clusters added, removed, made inactive, or the like. In another example, the system may weight particular the conclusions of particular models and/or model clusters more than others. Population architecture refers to a collection and particular arrangement of active machine learning models and/or clusters of machine learning models that are configured to process information mathematically or computationally to make decisions. Particular models and/or clusters may be weighted by the system to emphasize the impact or contribution of the particular models and/or clusters over others.

Embodiments of the targeting protection system 130 may include multiple systems, servers, computers or the like maintained by one or many entities. In some embodiments, the targeting protection system 130 may be part of the entity system 120. In other embodiments, the entity system 120 is distinct from the targeting protection system 130. The targeting protection system 130 may communicate with the entity system 120 via a secure connection generated for secure encrypted communications between the two systems either over the network 101 or alternative to the network 101.

FIG. 4a provides a high level process flow for interaction between a decision engine and a user 102, in accordance with one embodiment of the invention. Decision engine 312 interacts with AI and machine learning engine 330 in order to analyze profile data associated with user 102 and determine appropriate decisions based on identified targeting patterns. Decision engine 312 may work in concert with synthetic data engine 324, pattern extraction engine 326, and targeting protection engine 328 in order to optimize results for the user 102. User profile data that the decision engine 312 may receive from user 102 may include transaction history, communication history, characteristics and interaction history (e.g. internet history, cookie and privacy source data, and the like). In addition, decision engine 312 may receive data about user 102 that is sourced from data brokers or other third party systems 140 which is stored by the targeting protection system 130. As discussed previously, the decision engine 312, or targeting protection system 130 in general, may interface with user 102 using a number of different channel of communication, including the user's mobile device or personal computing device, ATMs, computing devices at entity locations, and various transaction or resource distribution channels. In some embodiments, the targeting protection system 130 may interface with user 102 using more than one channels at a time.

FIG. 4b provides a high level process flow for targeting determination between a target user and mixed data population, in accordance with one embodiment of the invention. As discussed previously, the target user 410 is a subset of user 102 which the targeting protection system 130 has identified may be subject to targeting by one or more entities or third party systems 140. The identification of the user as a target of targeting, or as a target user 410, is achieved by analysis of user profile data in conjunction with mixed data population 412. Mixed data population 412 may include historical data, policy data, synthetic data, and learned data, and a population of entities or third party systems 140 may be continuously monitored to determine how certain interactions, transactions and events between users and those third party systems 140 may vary according to certain data characteristics. Over time, the targeting protection system 130 may identify and extract details of adversarial targeting patterns through the use of various data from the mixed data population, such as the injection of synthetic data.

In some embodiments, the targeting determination step 420 may indicate that targeting is occurring but that the targeting is non-adversarial based on analysis of other profiles (e.g. the targeting protection system 130 may determine that a target user 410 known to be located in a specific city is being profiled according to their location and provided with weather data relevant to that location). In such instances, the targeting protection system 130 may still label the user 102 as a target user 410, and may record the non-adversarial targeting determination in the historical profile database 314 or policy database 316. The decision engine 312 may determine that further action is not necessary to deter targeting of the target user 410. For instance since the targeting data is merely being used to provide information pertinent to the target user 410, the decision engine 312 may determine that the target user 410 would not benefit from the injection of other profile data or the implementation of profile shielding. In some embodiments, the targeting protection system 130 may still flag the targeted user 410 and continuously monitor interactions between the user and the entity implementing the non-adversarial targeting scheme because it may identify that the specific non-adversarial targeting scheme has the potential for becoming adversarial, or negatively affecting the target user 410, in the future (e.g. a brick-and-mortar store location begins adversarial targeting of users based on location when a rival store location in same vicinity goes out of business).

FIG. 4c provides a high level process flow for interaction between a decision engine and a target user with included profile shielding 430, in accordance with one embodiment of the invention. The decision engine 312 may analyze data transmitted between the target user 410 and third party systems 140 and determine, based on the specific characteristics of the target user 410 and the targeting scheme detected, that it is in the best interest of the target user 410 to apply profile shielding 430, which comprises multiple approaches of altering the profile data of target user 410 before it is transmitted to third party systems. As described further with respect to FIG. 6, profile shielding 430 may take the form of swapping profile data, randomizing profile data, and injecting various profile data into the real time data stream such as historical profile data, data from other users who have been determined to have received favorable targeting results, and/or injecting synthetic profile data generated by the synthetic data engine 324 and determined by the decision engine to 312 to be favorable to the target user 410 based on the targeting scheme determined by the decision engine 312.

FIG. 5 provides a block diagram of data collection and utilization for targeting determination, in accordance with one embodiment of the invention. As shown, targeting determination 420 involves use of pattern extraction engine 326, which utilizes data from a number of sources in order to implement reference data analysis and comparison as shown by block 510. As discussed previously, the targeting protection system 130 is designed to receive, produce, store and analyze data from a number of sources and third party systems 140. It is understood that the targeting protection system 130 may be designed to acquire data from a number of public and private sources, which may be internal sources (i.e. controlled or owned by the same entity implementing and managing the profile protection system 130) or external sources, such as from one or more third party systems 140. This data may include historical data 512, synthetic data 514, individualized profile data 516, and reference data 518. Data may be analyzed by a combination of neural network based learning engines and comparison modules of the targeting protection system 130 such as AI and machine learning engine 330. This analysis may be performed on historical data 512, synthetic data 514, individualized profile data 516, and reference data 518 in order to implement reference data analysis comparison 510. It is understood that some data may be classified in multiple ways. For instance, certain data may be simultaneously identified as both historical data 512 and individualized profile data 516 depending on the data's characteristics.

Historical data 512 may include data related to a population of user that the targeting protection system 130 has received or acquired related to one or more past communications of users 102, such as, but not limited to, characteristic data, account data, transaction data, public record data, browsing history, metadata associated with communications involving the user 102 (e.g. timestamp, location, file size, device settings/characteristics, and the like), and past treatments and identified targeting decisions from third party systems that may have affected the user 102. Historical data 512 may also include decision history of the targeting protection system 130. Data may be analyzed by a combination of neural network based learning engines and comparison modules of the targeting protection system 130 such as AI and machine learning engine 330.

Individualized profile data 516 may include similar data as contained in historical data 512, but may not necessarily be related to past communications or transactions conducted by the user 102. Rather, individualized profile data 516 data may be any data stored by the targeting protection system 130 that is related to the user 102. As such, may include characteristic information, user preferences, determinations made by the targeting protection system 130, metadata associated with the user 102, account data, interests and hobbies, social media profile information and activity, and the like. Reference data 518 represents data that the system uses to compare and analyze historical data 512 and individualized profile data 516 in order to identify and extract patterns that the system can further use to make determinations. Reference data 518 may include data associated with users 102 or third party entities 103. Reference data 518 may also include data related to past identified targeting schemes, merchant characteristics, market data, news data, administrator preferences, decision boundaries, user requests, user interaction data, and other data that may be useful in determining patterns and implementing decisions for targeting protection.

The system may also incorporate synthetic data 514, which is data that the system has produced rather than received or acquired from another source. In some cases, synthetic data 514 may be similar to data that the system has observed in historical data 512, individualized profile data 516, or reference data 518. The system may alter certain data points in an iterative or predictive fashion using various neural network, machine learning, and AI processes in order to create a dataset that mirrors observed or acquired data, but that is altered in some way so that the system may make a wider range of determinations and fill knowledge gaps that may exist for certain data sets related to identified targeting schemes. The synthetic data 514 may be used for training a machine learning model or artificial intelligence engine, and may also be combined with historical data or user profile data in order to create synthetic profiles. The synthetic data 514 may include adversarial or extrapolated scenarios or data generated by the systems described herein which may be fed back into machine learning models to train the system. In addition, the system may use synthetic data to build synthetic interaction profiles to be used for interacting with third party systems 103 in order to gain knowledge of targeting scheme characteristics and patterns. In some embodiments, the synthetically generated data may be injected into real-time data streams between users 102 and third party systems 103 incrementally over a predetermined period of time. Certain pattern identification and extraction models within the system may be trained using a combination of historical and synthetic data, while in other embodiments certain models may be trained using solely synthetic data. In each case, data from the various models may be assessed and weighted according to determined model accuracy and effectiveness for identifying targeting schemes and shielding targeting from affecting users 102.

FIG. 6 provides a high level process flow for implementation of profile shielding by a target user, in accordance with one embodiment of the invention. As discussed previously, the system utilizes profile shielding 430 in order to protect the user 102 from adversarial targeting patterns that have been identified by the system. Adversarial targeting is represented in FIG. 6 by adversarial AI engine 610, which is the decision engine located at an external entity that is implementing some sort of targeting scheme against a target user 410. In this embodiment, a target user 410 may be a subset of one or more users 102. Once the targeting scheme is detected and determined by the system, the system may implement various protection mechanisms for shielding the target user 410 from the adversarial targeting, such as profile swapping 620, profile randomization, 622, and synthetic profile injection 624.

Profile swapping 620 may be implemented by the system by swapping the profile of the target user 410 with data from another profile stored in the system that has been determined to receive more favorable treatment from the particular adversarial AI engine 610 being used against the target user 410. Similarly, the system may implement a profile randomization 622 if the system determines that the adversarial AI engine reacts positively to the introduction of new profile characteristics during any given interaction. For instance, a target user 410 may receive favorable treatment in their initial interaction with the adversarial targeting engine 610, such as receiving a promotional price for a given product, or a lower price for a given product the first time that the target user 410 indicates that their interest in possibly purchasing the product. In some embodiments, certain data characteristics of the target user 410 profile may be randomized over the course of the interaction with the adversarial AI engine, as opposed to randomizing all of the data characteristics. The decision to randomize certain or all data characteristics may be based on a determination that the identified targeting scheme is acting on specific profile data characteristics, or may be implemented based on a goal of confusing the adversarial AI engine 610 such that it cannot accurately detect a pattern of data characteristics that the system has determined are considered by the adversarial AI engine 610. The system may also use synthetic profile injection 624, wherein synthetic data generated by the system is injected into the communication based on the determined data characteristics considered by adversarial AI engine 610. In some embodiments, the synthetically generated data may be injected into real-time data streams between target user 410 and adversarial AI engine 610 incrementally over a predetermined period of time, while in other embodiments, the entire user profile for target user 410 may be swapped for a synthetic profile that the system has determined will yield favorable results.

FIG. 7 provides a block diagram of profile data sets utilized by a targeting protection engine 328, in accordance with one embodiment of the invention. As shown, targeting protection engine 328 utilizes a number of databases in order to protect users against adversarial AI engine 610. Depicted in FIG. 7 are various profile databases, including historical profile database 810, synthetic profile database 820, and randomized profile database 830. Historical profile database 810 contains any number of profiles corresponding to received or acquire historical data for users that have interacted with adversarial AI engine 610 or other detected targeting patterns. As shown, the historical profiles are categorized by the system such that each profile has a unique profile identifier, such as historical profile 1, historical profile 2, which continues to the last historical profile stored in the historical profile database 810, as represented in FIG. 7 by historical profile n+1. Synthetic profile database 820 contains any number of profiles corresponding to synthetically generated data that the system has generated and stored for use in interacting with adversarial AI engine 610 or other detected targeting patterns. As shown, the synthetic profiles are categorized by the system such that each profile has a unique profile identifier, such as synthetic profile 1, synthetic profile 2, which continues to the last synthetic profile stored in the synthetic profile database 820, as represented in FIG. 7 by synthetic profile n+1. Randomized profile database 830 contains any number of profiles corresponding to randomized data for use in interacting with adversarial AI engine 610 or other detected targeting patterns. As shown, the randomized profiles are categorized by the system such that each profile has a unique profile identifier, such as randomized profile 1, randomized profile 2, which continues to the last randomized profile stored in the randomized profile database 830, as represented in FIG. 7 by randomized profile n+1. The randomized profile database may be used by the system during the iterative learning process of the neural network machine learning applications as well as pattern extraction engine 326 in order to gain a clearer understanding of how the adversarial AI engine 610 interacts with randomized data sets. In certain instances it may also be determined that randomized profiles receive more favorable treatment due to the nature of the particular AI engine 610 that the user is interacting with.

FIG. 8 provides a high level proves flow for detection of adversarial targeting and extraction of targeting and decisioning details, in accordance with one embodiment of the invention. As shown by block 801, a population of entities is continuously monitored in terms of interactions, transactions, and other events between the entities and users. Over time, the system observes the decisioning of the AI engine used by various entities. As shown in block 802, the resultant data and reactions of the AI engines is learned over different population segments corresponding to various profile data characteristics, and this resultant data is stored for individual entities over time as the system models, determines and extracts patterns from the AI engines it interacts with. Analysis of the learned and observed decisioning and targeting schemes for the AI engines is detected and it is then determined if the AI engine is implementing an adversarial targeting scheme as shown in block 803.

The process includes an iterative feedback loop as shown by FIG. 8 wherein the monitoring of interactions between users and entities is completed in a continuous fashion even after adversarial targeting is detected, such that the system can gain insight as to the details of identified targeting patterns and how the targeting patterns may change over time. In some embodiments, data is continuously monitored and/or collected in real-time as interactions occur. In this way, the system may learn and be reconfigured dynamically to account for even small data sources or subtle changes to the received data stream. As shown, based on whether or not adversarial targeting has been detected, the system may either return to continuously monitoring the populations of entities, or continue to block 804, wherein the system extracts details of the adversarial targeting patterns through analysis of historical data and targeted interactions using synthetic profile data. Each particular adversarial AI targeting scheme identified is characterized based on the particular type and subset of profile data that the AI targeting scheme uses to make decisions, as shown in block 805. The system then calculates particular features and characteristics of user profile data that can be shielded based on the identified AI targeting schemes in order to prevent the adversarial targeting and decisioning from negatively affecting users, as shown by block 806.

FIG. 9 provides a high level process flow for analyzing and configuring profile shielding, in accordance with one embodiment of the invention. As shown by block 901, the process may begin by identifying an interaction or transaction between the user and an entity known to be employing a biased adversarial AI engine, as determined by data and analysis collected by the system, or some other data received by the system to indicate the adversarial targeting scheme. As previously discussed, this is achieved by continuous monitoring and comparing communications between the users and various third party entities to determine correlations between user profile data and treatment of the users by the third party entities. In addition, the system may independently initiate various interactions and transaction communications with third party entities using synthetic profile data in order to generate additional reaction data for use by the system's machine learning and neural network engines to identify and extract targeting patterns used by the various third party entities. As shown in block 902, if the system identifies an interaction or transaction communication between the user and a known adversarial AI engine, the system may then analyze historical profile, synthetic profile, and randomized profile candidates based on the known patterns extracted and analyzed for the particular adversarial AI engine in question. Based on the pattern characteristics for the adversarial AI engine in question, the system determines the best options for targeting protection and proceeds with the interaction through the selected profiles or combination of best profile options for targeting protection, as shown by block 903.

The system maintains an iterative feedback loop wherein the performance of the interaction is assessed to identify any changes needed to the existing profile options based on the reaction data from the adversarial AI engine in question. As previously discussed, the system is configured to reconfigure or adjust the machine learning model and/or model clusters in response to or based on the analysis of the performance metrics in order to correct for performance objectives (e.g., accuracy, robustness, adaptability/diversity, adversarial, or the like). The system determines if the solution of selected profiles or combination of best profile options meets initial criteria. The initial criteria may be determined by system administrator, or may be dynamically determined by the system itself based on the identified adversarial targeting scheme. For instance, if the system identifies that the adversarial targeting scheme favors users 104 associated with a certain profile characteristic, the system may determine initial criteria based on the favored profile characteristics. In one embodiment, reconfiguring the population comprises providing additional training to the model and/or model clusters based on the analyzed resultant output. For example, an output determined to be accurate may be input back into a model and/or model cluster to further train the model with regards to the accurate result. This is shown in FIG. 9 wherein the system proceeds with interaction through a selected profile option or combination of profiles, as shown at block 904. The interaction performance is assessed to determine if any changes to the profile are needed, which may require reconfiguring the population data and profile data. In another embodiment, reconfiguring the population may comprise continuing to train the models with the real-time data stream and/or historical data, wherein the models continue to adapt and learn, as shown by block 905, wherein necessary changes are identified and models are reconfigured to generate improved profiles.

In some embodiments, the system is configured to generate and inject synthetic data or information into the population of machine learning models to enhance learning and reconfigure the population. In one embodiment, the system is configured to inject synthetic data into the population similar to the input data stream, wherein the injected synthetic data may enhance the real-time data. Synthetic data may include data and/or scenarios not experienced in the historical data storage or the real-time data stream. For example, the injected synthetic data may be intentionally injected with synthetically generated adversarial data to train the model to recognize potentially adversarial scenarios accurately and reliably. Potentially, without the synthetic data injection, the model may have a reduced ability to recognize unknown or unfamiliar data in a rapidly changing environment. In another embodiment, the system is configured to inject or input an entire synthetically trained machine learning model, wherein the synthetic model is synthetically trained with data not typically experienced in the real-time data stream. In both of these embodiments, the synthetically generated and injected data is then processed fed or input back into the population to enhance adaptability and reliability of the whole system. The analysis and learning process is performed incrementally and continuously over time. The system may then incorporate changes in selected profiles or combination of best profile options by using profile randomization or synthetic profile data, and again assess whether or not the proposed targeting protection solution meets system criteria. If the proposed protection solution meets system criteria, the system proceeds with the interaction or transaction through the selected profiles or combination of profiles, as shown by block 906.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with collaborative machine learning and population reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for mitigating adversarial targeting using machine learning, the system comprising:
   a module containing a memory storage device, a communication device, and a processor, with computer-readable program code stored thereon, wherein executing the computer-readable code is configured to cause the processor to:
   identify, using one or more machine learning models, a user targeting pattern employed by an entity, wherein the entity comprises a third party system, based on interaction data between the entity and one or more users;
   identify specific user profile data correlated with specific responses from the entity, and, using the identified specific response, train the one or more machine learning models to identify a subset of one or more favorable responses from the specific responses, wherein the one or more favorable responses comprise a lower resource value for a product as compared to another user with different user profile data; and
   trigger the one or more favorable responses by altering the user profile data for the one or more users prior to interaction with the specific entity.

2. The system of claim 1, wherein executing the computer-readable code is further configured to cause the processor to:
   generate synthetic profile data;
   transmit the synthetic profile data to the entity;
   analyze, using the one or more machine learning models, entity responses to the synthetic profile data from the entity; and
   update the identified targeting pattern using the analyzed entity responses to the synthetic profile data.

3. The system of claim 2, wherein executing the computer-readable code is further configured to cause the processor to:
   identify, via the one or more machine learning models, a subset of one or more desired responses associated with the synthetic profile data; and
   trigger the one or more desired responses by replacing a subset of the profile data with the synthetic profile data.

4. The system of claim 1, wherein executing the computer-readable code is further configured to cause the processor to:
   receive profile data for the one or more users and store the profile data for the one or more users as mixed population data in a historical database;
   monitor data transmitted between the one or more users and the entity and store the data transmitted as interaction data in the historical database;
   identify variances in the interaction data and variances in the mixed population data between the one or more users; and
   analyze, using the one or more machine learning models, the variances in the interaction data and the variances the mixed population data and train the one or more machine learning models to identify the targeting pattern employed by the entity.

5. The system of claim 4, wherein altering the user profile data for one or more users further comprises:
   analyzing the interaction data to compare treatment of the one or more users by the identified targeting pattern;
   identifying a specific user that receives favorable treatment by the adversarial targeting scheme relative to other users; and
   incorporating profile data from the specific user that receives favorable treatment into the profiles of one or more other users.

6. The system of claim 1, wherein altering the user profile data for the one or more users further comprises generating random user profiles containing a randomized set of user profile data.

7. The system of claim 6, wherein the randomized set of user profile characteristics contains synthetically generated user profile data and user profile data from a mixed population of user data.

8. The system of claim 1, wherein the user profile data is altered and in real-time in response to the interaction data.

9. A computer program product for mitigating adversarial targeting using machine learning, the computer program product comprising at least one non-transitory computer-readable medium having computer-readable program code portions embodied therein, the computer-readable program code portions comprising:
   an executable portion configured for identifying, using one or more machine learning models, a user targeting pattern employed by an entity, wherein the entity comprises a third party system, based on interaction data between the entity and one or more users;
an executable portion configured for identifying specific user profile data correlated with specific responses from the entity, and using the identified specific response, training the one or more machine learning models to identify a subset of one or more favorable responses from the specific responses, wherein the one or more favorable responses comprise a lower resource value for a product as compared to another user with different user profile data; and
an executable portion configured for triggering the one or more favorable responses by altering the user profile data for the one or more users prior to interaction with the specific entity.

10. The computer program product of claim 9, wherein executing the computer-readable code is further configured to cause the processor to:
generate synthetic profile data;
transmit the synthetic profile data to the entity;
analyze, using the one or more machine learning models, entity responses to the synthetic profile data from the entity; and
update the identified targeting pattern using the analyzed entity responses to the synthetic profile data.

11. The computer program product of claim 10, wherein executing the computer-readable code is further configured to cause the processor to:
identify, via the one or more machine learning models, a subset of one or more desired responses associated with the synthetic profile data; and
trigger the one or more desired responses by replacing a subset of the profile data with the synthetic profile data.

12. The computer program product of claim 9, wherein executing the computer-readable code is further configured to cause the processor to:
receive profile data for the one or more users and store the profile data for the one or more users as mixed population data in a historical database;
monitor data transmitted between the one or more users and the entity and store the data transmitted as interaction data in the historical database;
identify variances in the interaction data and variances in the mixed population data between the one or more users; and
analyze, using the one or more machine learning models, the variances in the interaction data and the variances the mixed population data and train the machine learning model to identify the targeting pattern employed by the entity.

13. The computer program product of claim 12, wherein altering the user profile data for one or more users further comprises:
analyzing the interaction data to compare treatment of the one or more users by the identified targeting pattern;
identifying a specific user that receives favorable treatment by the adversarial targeting scheme relative to other users; and
incorporating profile data from the specific user that receives favorable treatment into the profiles of one or more other users.

14. The computer program product of claim 9, wherein altering the user profile data for the one or more users further comprises generating random user profiles containing a randomized set of user profile data.

15. The computer program product of claim 14, wherein the randomized set of user profile characteristics contains synthetically generated user profile data and user profile data from a mixed population of user data.

16. The computer-implemented method of claim 15, further comprising:
receiving profile data for the one or more users and store the profile data for the one or more users as mixed population data in a historical database;
monitoring data transmitted between the one or more users and the entity and store the data transmitted as interaction data in the historical database;
identifying variances in the interaction data and variances in the mixed population data between the one or more users; and
analyzing, using the one or more machine learning models, the variances in the interaction data and the variances the mixed population data and train the machine learning model to identify the targeting pattern employed by the entity.

17. The computer-implemented method of claim 16, wherein responding to the abnormally injected data further comprises:
analyzing the interaction data to compare treatment of the one or more users by the identified targeting pattern;
identifying a specific user that receives favorable treatment by the adversarial targeting scheme relative to other users; and
incorporating profile data from the specific user that receives favorable treatment into the profiles of one or more other users.

18. A computer-implemented method for preventing poisoning attacks in machine learning systems in real time, the computer-implemented method comprising:
identifying, using one or more machine learning models, a user targeting pattern employed by an entity, wherein the entity comprises a third party system, based on interaction data between the entity and one or more users;
identifying specific user profile data correlated with specific responses from the entity, and, using the identified specific response, training the one or more machine learning models to identify a subset of one or more favorable responses from the specific responses, wherein the one or more favorable responses comprise a lower resource value for a product as compared to another user with different user profile data; and
triggering the one or more favorable responses by altering the user profile data for the one or more users prior to interaction with the specific entity.

19. The computer-implemented method of claim 18, further comprising:
generating synthetic profile data;
transmitting the synthetic profile data to the entity;
analyzing, using the one or more machine learning models, entity responses to the synthetic profile data from the entity; and
updating the identified targeting pattern using the analyzed entity responses to the synthetic profile data.

20. The computer-implemented method of claim 19, further comprising:
identifying, via the one or more machine learning models, a subset of one or more desired responses associated with the synthetic profile data; and
triggering the one or more desired responses by replacing a subset of the profile data with the synthetic profile data.

* * * * *